Figure 1:
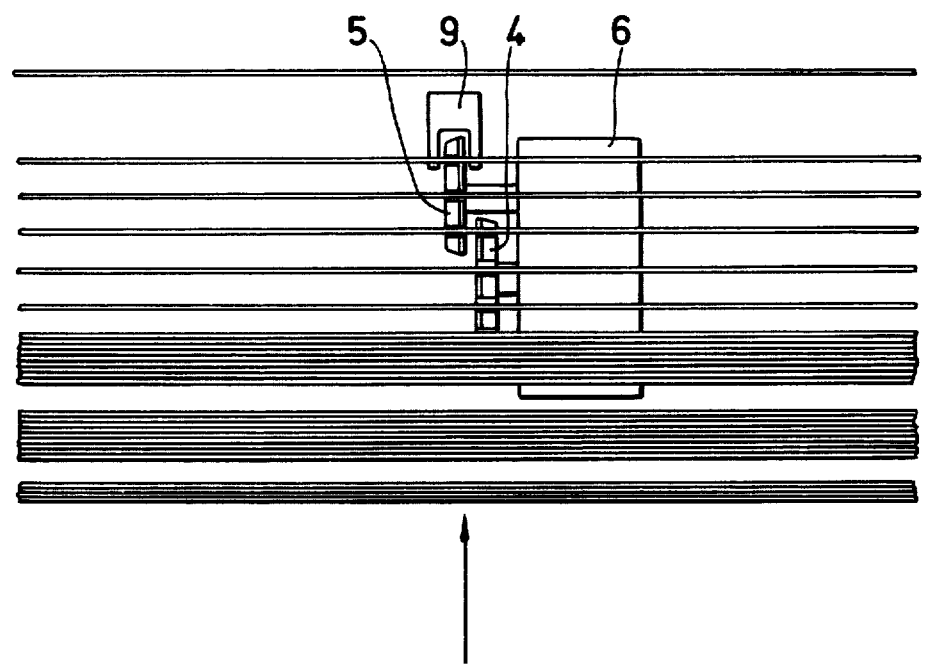

United States Patent [19]
Bohlmark

[11] 3,904,020
[45] Sept. 9, 1975

[54] ROD COUNTER

[75] Inventor: Arne Sven Bohlmark, Sundsvall, Sweden

[73] Assignee: Sunds Aktiebolag, Sundsvall, Sweden

[22] Filed: June 18, 1974

[21] Appl. No.: 480,358

[30] Foreign Application Priority Data
July 13, 1973  Sweden .................... 7309849

[52] U.S. Cl. .................... 198/40; 214/1 P; 214/1 C
[51] Int. Cl.² .................................... B65G 43/00
[58] Field of Search .................... 209/73; 198/40, 34; 214/1 P, 1 PB, 1 C, 1 MD, 2.5; 235/98 R

[56] References Cited
UNITED STATES PATENTS
| | | | |
|---|---|---|---|
| 3,151,747 | 10/1964 | McGoogan | 214/1 P |
| 3,373,868 | 3/1968 | Missioux et al. | 214/1 P |
| 3,627,146 | 12/1971 | Berndt | 214/1 P |

Primary Examiner—Allen N. Knowles
Attorney, Agent, or Firm—Pierce, Scheffler & Parker

[57] ABSTRACT

In an apparatus for counting rod-like objects including a separation device and a device for indicating the number of objects, separation of the rods is effected by advancing them in steps via a feed wheel and a counting wheel, in such a manner, that only one rod at a time passes the indication device, irrespective of the location of the rods on the conveying web for feeding the rods. Owing to the vibrations propagated along the rods by the stepped feed, the rods are separated from one another along their entire length.

5 Claims, 7 Drawing Figures

ROD COUNTER

This invention relates to an apparatus for counting rod-shaped objects. The apparatus is intended to separate objects from an irregularly advanced line of rod-shaped objects, for example iron rods, reinforcement rods, etc., to move the objects piece by piece and thereby provide the possibility of automatically counting their number with high accuracy, for example by means of a photoelectric cell connected to a counting mechanism. A certain number of objects are then bound together, e.g. in a bundling machine.

According to a previously known system, rods are advanced on a conveyor, from which they drop freely to a collecting place for bundles. During their fall the rods are counted by a photoelectric cell connected to a counting mechanism. The counting mechanism stops the conveyor before a full number of rods have passed the photoelectric cell. After said stop, the counting mechanism is read manually and the remaining number of rods are added to the bundle manually.

Such a system, thus, requires manual engagement for each bundle. The counting precision depends entirely on that the rods prior to their fall lie in good order on the conveyor. When, for example, two rods lie above each other, they will pass the light curtain simultanaeously and thereby be indicated as one rod. The above system, moreover, cannot be applied in practice when rods for small bundles are to be counted, because the stop periods for manual engagements then are too long and the capacity is appreciably limited.

According to another system, the rods are fed from a conveyor by means of a screw past an indication device, usually a photoelectric cell connected to a counting mechanism.

This system does not manage, either, to separate rods from each other when they lie above each other on the conveyor before they pass the counting mechanism. It is particularly difficult to prevent rods from lying above each other when they have small dimensions, up to 12 mm in diameter. The accuracy of counting, consequently, is entirely dependent on the equipment disposed before the counting mechanism.

The present invention eliminates the disadvantages of the conventional systems and provides at the same time additional advantages. The rods are advanced in steps via a feed wheel and a counting wheel, in such a manner, that only one rod at a time passes the indication device, irrespective of the location of the rods on the conveying web for feeding the rods. Owing to the vibrations propagated along the rods by the stepped feed, the rods are separated from one another along their entire length.

Figure 2:
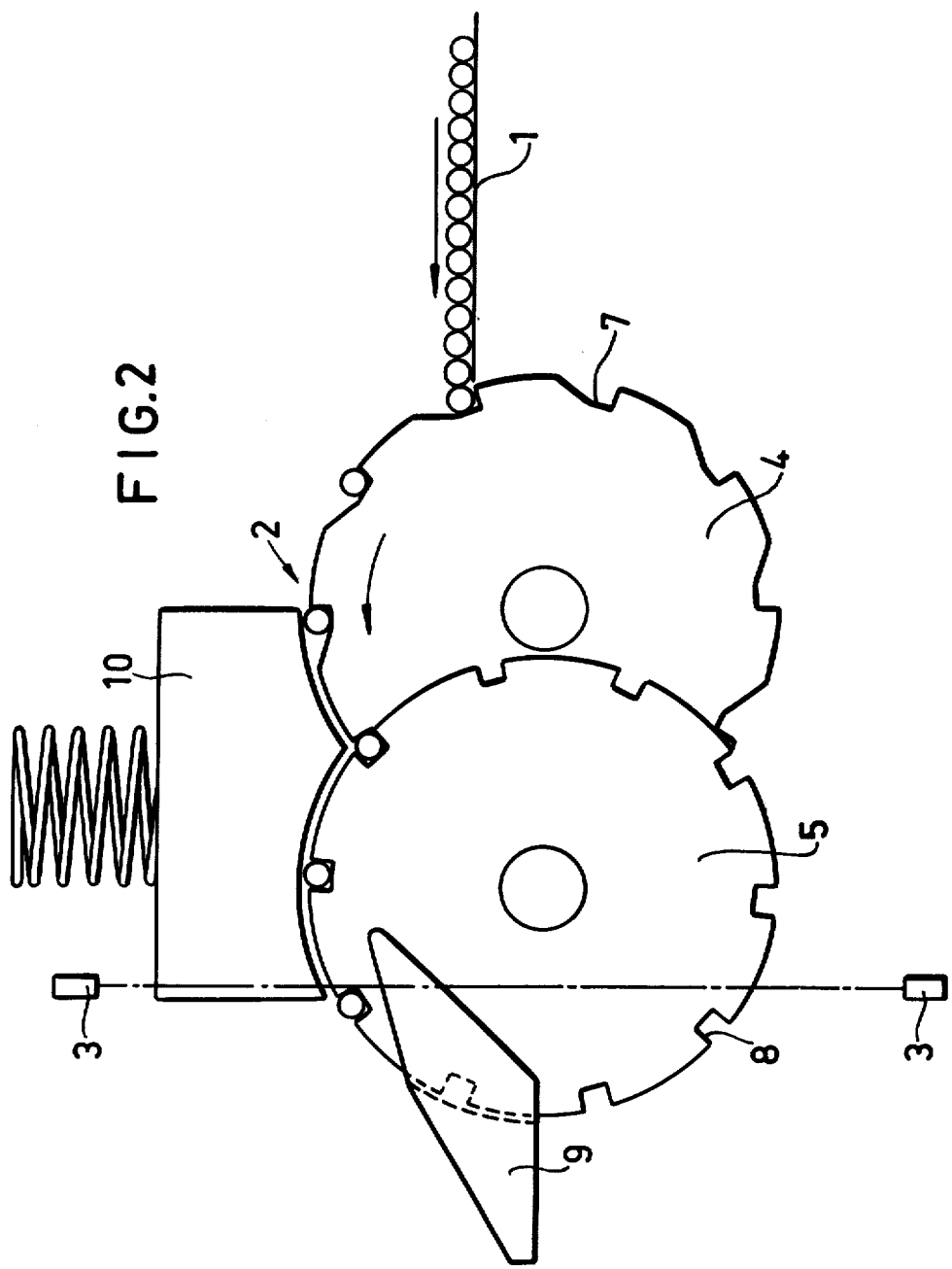
Figure 3:
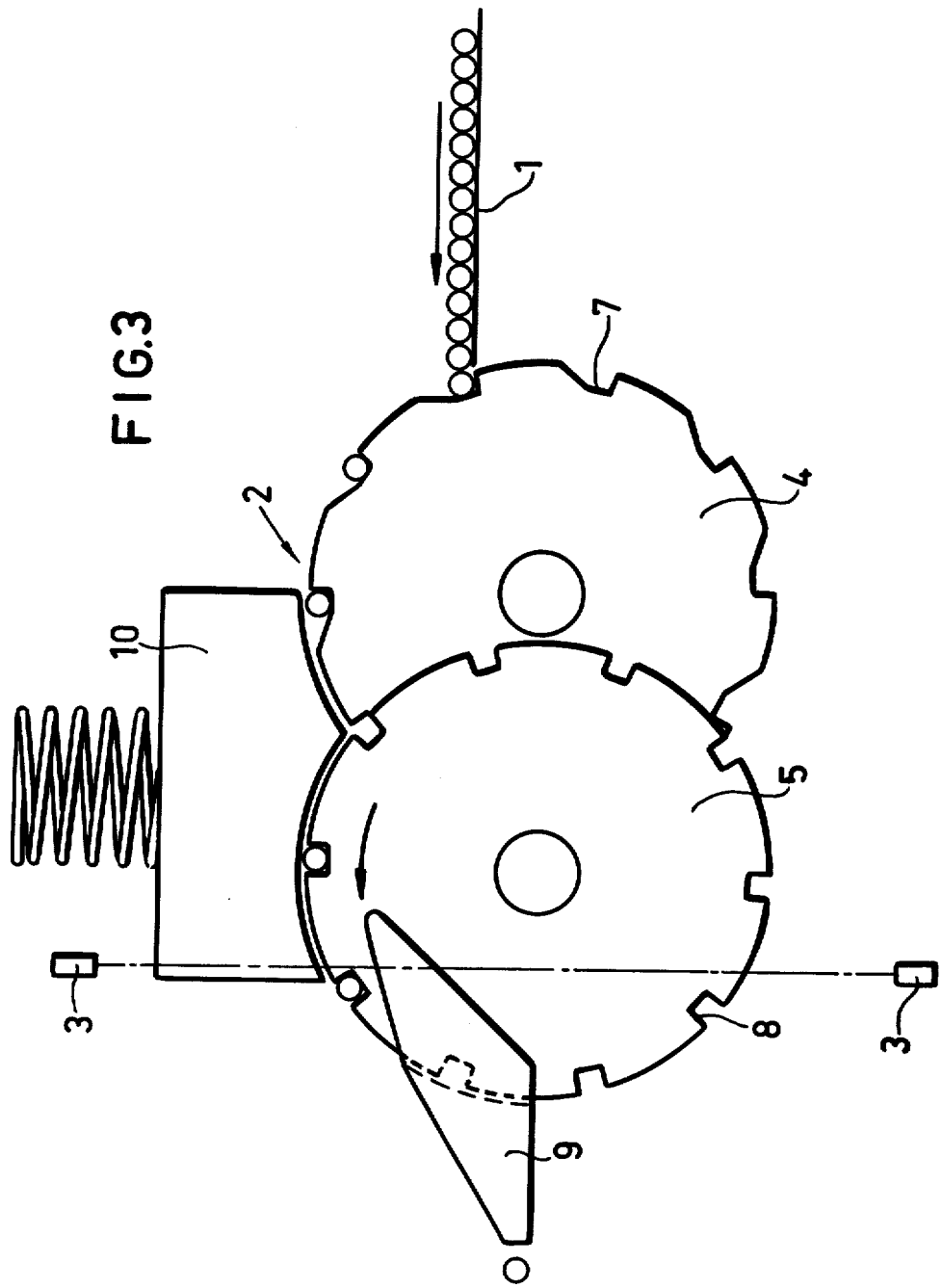
Figure 4:
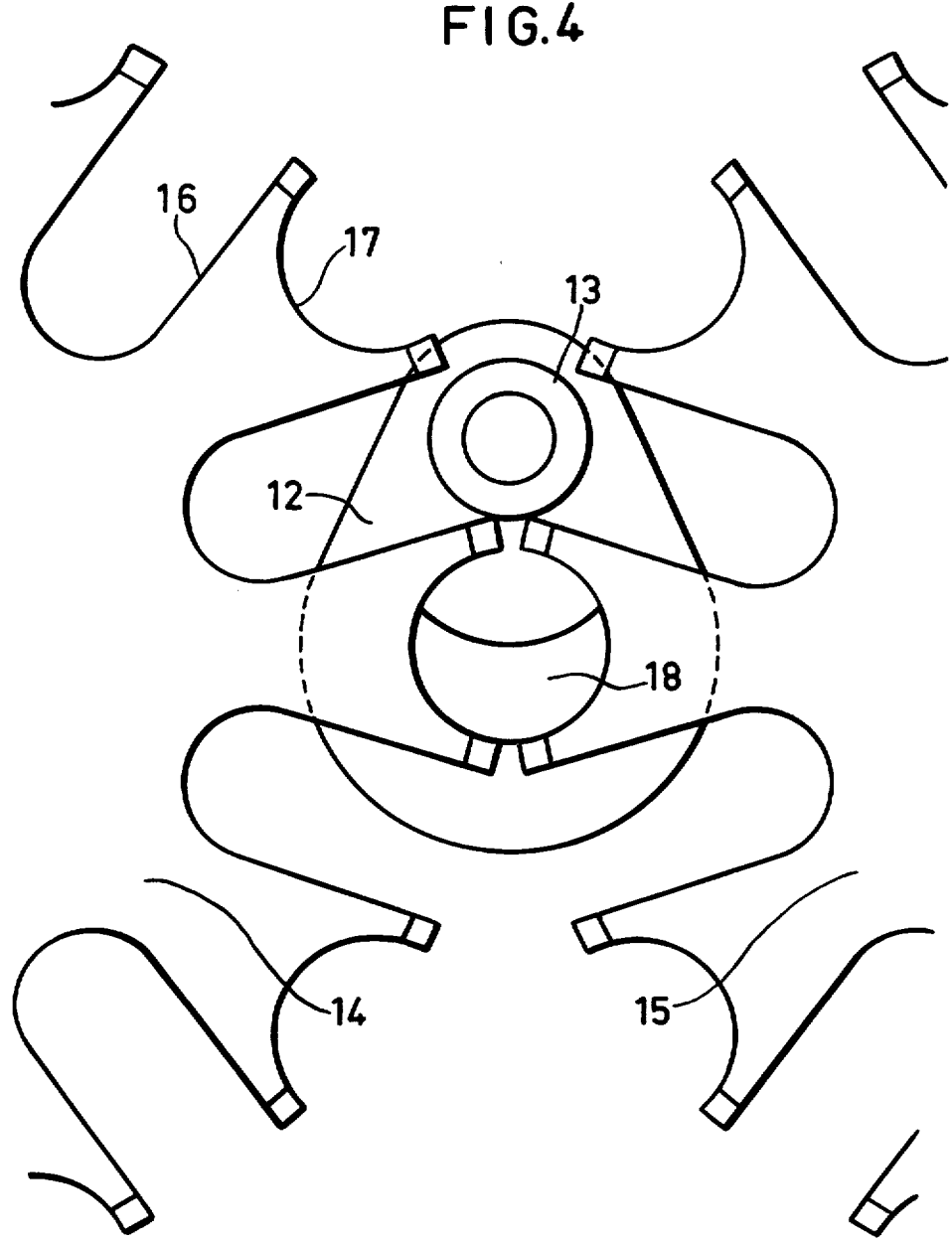
Figure 5:
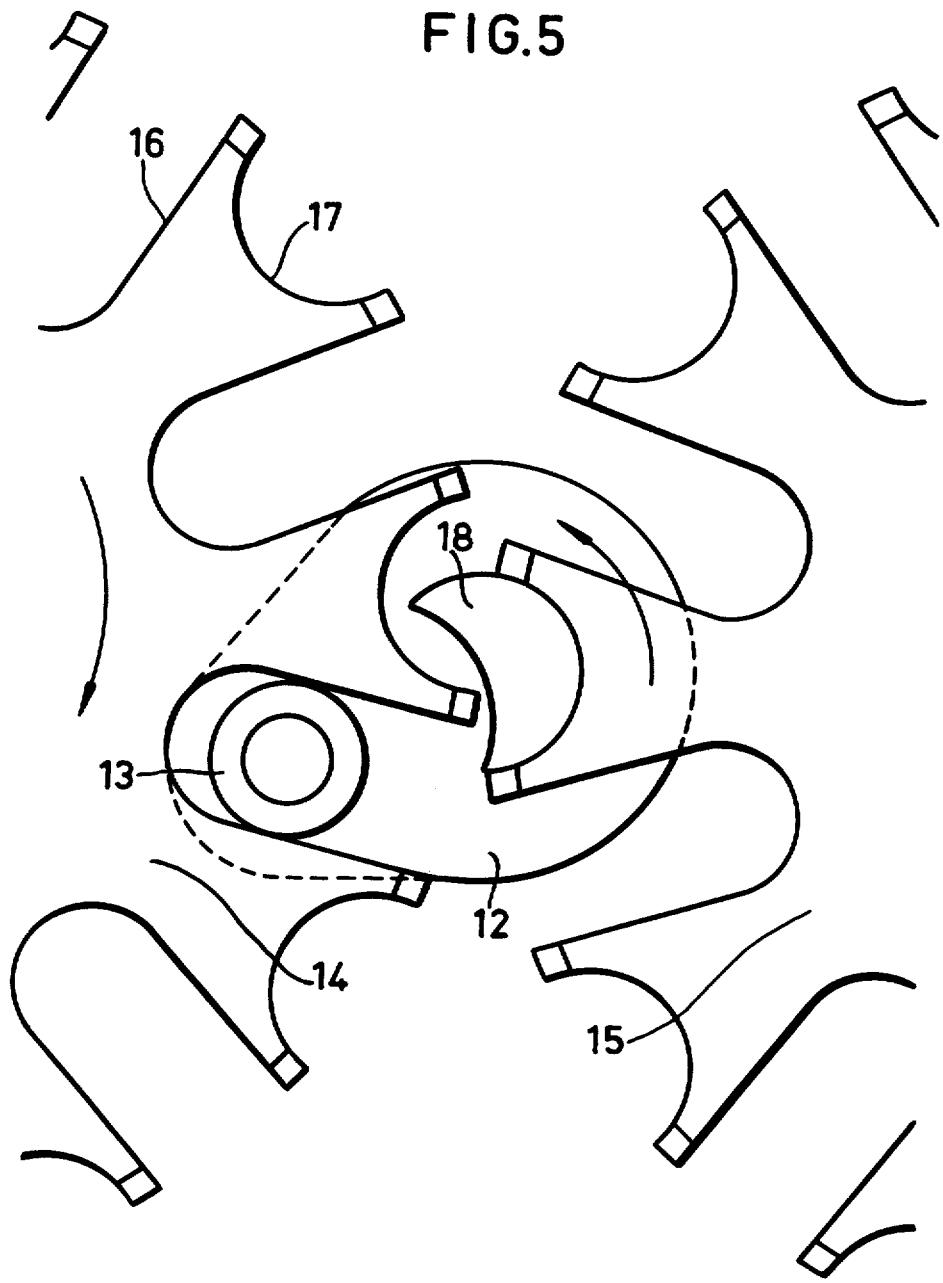
Figure 6:
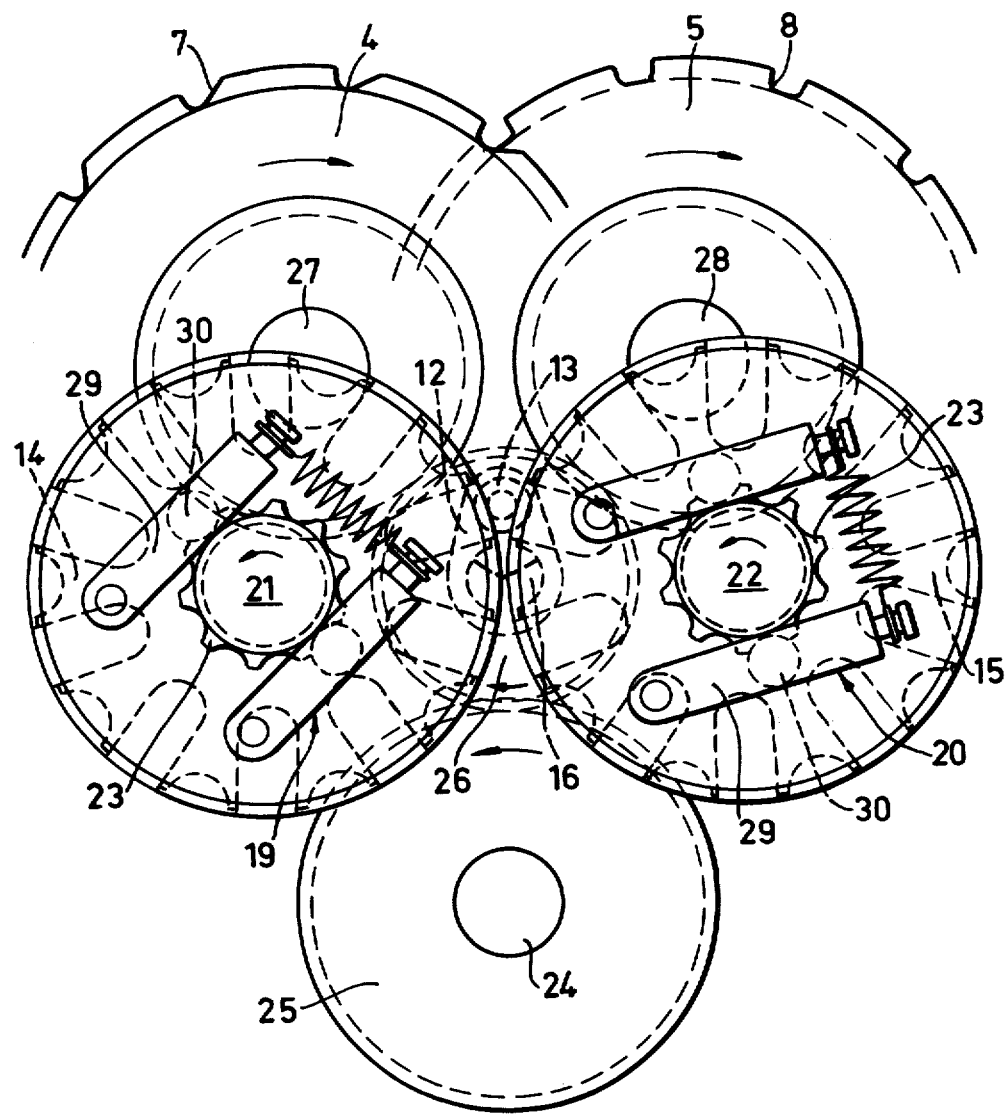
Figure 7:
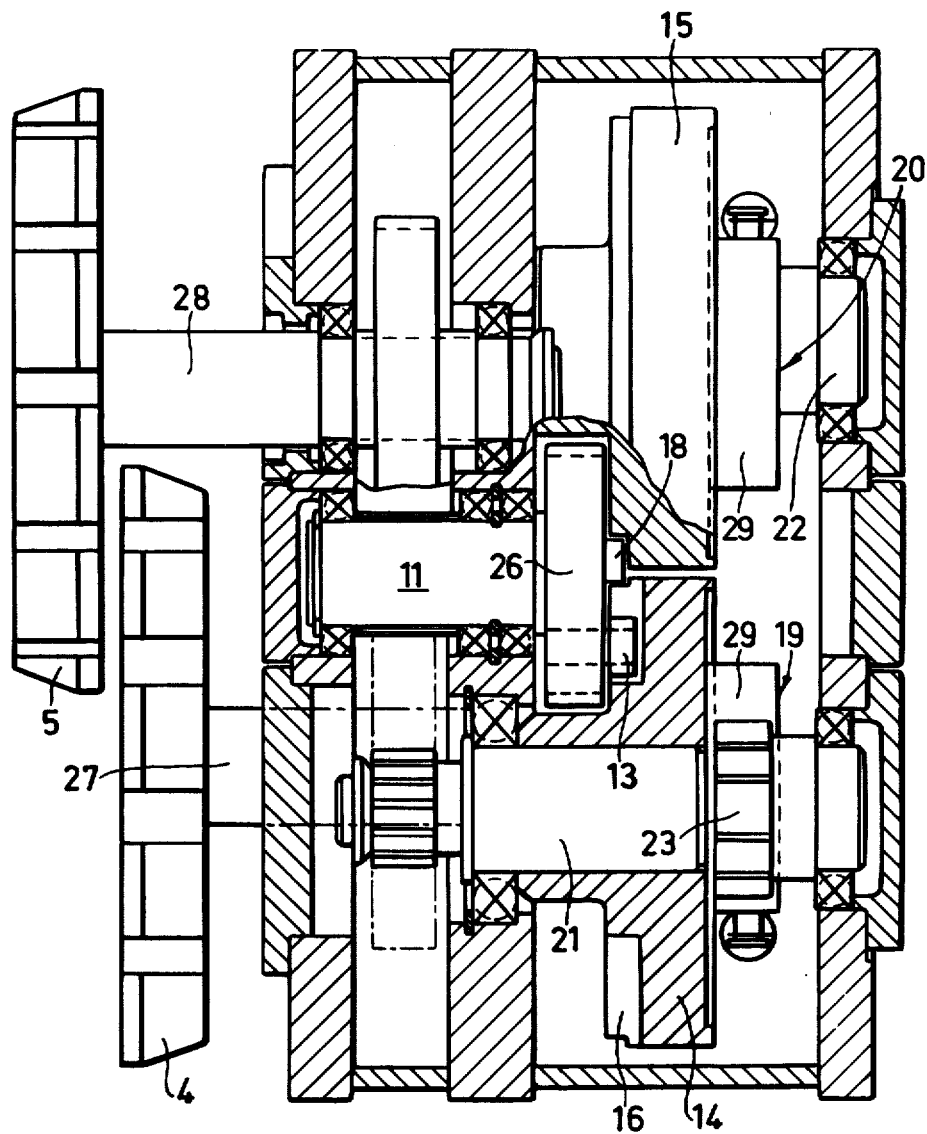

The characterizing features of the invention become apparent from the claims. An embodiment of the invention is described below, with reference to the drawings, in which FIG. 1 shows the apparatus seen from above, FIGS. 2 and 3 show the feed wheel and counting wheel in different positions of feeding, FIGS. 4 and 5 show the principle of the driving of the wheels, FIG. 6 shows in a schematic way the drive means for the two wheels seen from the side, and FIG. 7 shows a section through the drive means.

The apparatus shown comprises a web 1 for feeding rods to a unit 2 for separating the rods and an indication device 3 connected to a counting mechanism (not shown). The separating unit 2 comprises a feed wheel 4 and a counting wheel 5, which are driven by a drive means 6. The feed wheel 4 is provided at its periphery with gaps 7 having a depth corresponding to the rod diameter. The forward edge of the gaps 7 is so chamfered that upon rotation of the feed wheel a rod is lifted up from the web 1. The rod lifted up follows thereafter with the feed wheel 4 and is delivered into gaps 8 at the periphery of the counting wheel 5. The counting wheel 5 is so offset both radially and axially in relation to the feed wheel 4 that the two wheels overlap one another. The wheels 4 and 5 are rotated in steps and alternatingly, in such a way, that the rods lifted up from the web 1 are transferred one by one from a gap 7 in the feed wheel 4 to an empty idle gap 8 in the counting wheel. The counting wheel 5 thereafter steps the rods past the indication device 3 whereafter the rods drop down and form a bundle including the desired number of rods. At the counting wheel, preferably a pick-up device 9 is provided which ensures that the rods leave the counting wheel in the desired place.

The indication of the number of passing rods can be effected by different means per se known, for example by a light beam and a photoelectric cell. The impulses from the indication can then be transferred to a counting mechanism recording the number of rods. The wheels are stopped as soon as the desired number of rods have passed. Due to the stepped feed, the stop position can be determined accurately without requiring the stop position of the drive motor to be accurate, which latter stop position, thus, may vary within 210° and still render the stop position accurate for the counting wheel.

Above the wheels 4 and 5, a stripper 10 is located which may be fixed or resiliently suspended. Its object is to retain the rods down in their respective gaps 7 and 8 in the wheels and to prevent more than one rod in each gap 7 to follow with the feed wheel 4.

The principle of a suitable alternating and stepped drive of the wheels is apparent from FIGS. 4, 5 and 6. A central axle 11 (FIG. 7) is provided at the end with a crank arm 12 comprising a crank roll 13 for driving two step wheels 14 and 15 located in front of one another on both sides of the centre of the axle 11. Each step wheel in its turn drives the feed wheel 4 and, respectively, counting wheel 5.

The step wheels 14, 15 are provided with radial grooves 16 adjusted to the roll 13 of the crank arm. Between said radial grooves, the step wheels are provided with recesses 17 for a pin 18 on the crank arm. The pin has cylindric shape and is provided with an arched recess in the side surface facing the roll 13. The recesses 17 of the step wheels are accurately adjusted to the radius of said pin 18.

In FIG. 4 the drive means is shown in an upper neutral position. Both wheels are locked by the pin, which engages with the recesses 17 in the two wheels. In FIG. 5 the crank arm 12 has been turned and the roll 13 engages with the step wheel 14. The pin 18 by its shape permits rotation of the step wheel 14 while at the same time maintaining the step wheel 15 locked. The crank arm having rotated through half one revolution, the drive means has assumed a lower neutral position. The step wheel 14 had then been turned ahead one step. Upon continued rotation of the crank arm 12, the step wheel 14 is kept locked and the step wheel 15 is turned ahead one step, and so on.

Although the stripper 10 normally separates redundant rods from the gaps 7 on the feed wheel, the feed wheel may be blocked. When the stripper 10 is mounted rigidly and rods accumulate in front of the feed wheel, the rods can be clamped between the stripper and the feed wheel. When the stripper 10 is suspended resiliently, for example in a springy manner or actuated by gravity, several rods can enter simultaneously between the stripper and the feed wheel. In order to prevent at such occasions damages in the drive mechanism, overload couplings 19, 20 are provided between the step wheels 14 and 15 and the feed wheel and, respectively, counting wheel. The design of the couplings 19 and 20 is shown in FIG. 6. The couplings connect the step wheels 14 and 15 with axles 21 and 22, which transfer the rotation to the feed wheel and, respectively, counting wheel. The axles 21 and 22 are provided with a toothed ring 23 and the step wheels 14 and 15 are provided with two substantially parallel spring-loaded levers 29, on which pins 30 are provided which fit in between the teeth on the toothed rings 23. Jamming of the feed wheel or counting wheel implies that the axles 21 and 22 cannot be rotated, and at continued drive of the step wheels the overload couplings 19 and 20 will slip. The couplings can be set to a certain transfer moment.

When the stripper is suspended resiliently and an extra rod enters in below the stripper and advances to the counting wheel 5, the rotation of the feed wheel 4 is blocked, because each of the gaps 8 of the counting wheel provides space for only one rod. The counting wheel 5, however, can continue to step forward and transport away one of the two rods whilst the coupling 19 slips, so that the feed wheel 4 stands still until an empty gap on the counting wheel has been advanced. The operation runs thereafter again normally. In order to render possible the aforesaid effect, the number of teeth on the toothed rings 23 in the overload couplings must be a multiple of the number of radial grooves 16 in the step wheels 14 and 15. FIGS. 6 and 7 show the entire drive system for the feed and counting wheels, An axle 24 is driven by a motor (not shown) and provided with a gearwheel 25, which meshes with a gearwheel 26, on which the crank arm 12 is mounted. The step wheels 14 and 15, as described above, are rotated ahead alternatingly and in steps, in such a way, that the rotation is transferred via the overload couplings 19 and 20 to the axles 21 and 22, which in their turn via a gear drive the axles 27 and 28 of the feed wheel and, respectively, counting wheel.

The invention, of course, is not restricted to the embodiment described, but can be varied within the scope of the claims.

I claim:

1. An apparatus for counting rod-shaped objects comprising a web for advancing objects, a separating device with which said web communicates to deliver objects thereto, and an indicating device (3) for indicating the number of objects passing through said separating device, wherein said separating device (2) comprises a feed wheel (4) and a counting wheel (5), which at their periphery are provided with gaps (7, 8) for receiving the objects, said wheels (4, 5) being located one after the other overlapping one another and adapted to be rotated in steps and alternatingly a distance corresponding to the distance between the gaps (7, 8) by a drive means (6) so as to transfer the objects in steps from a gap (7) in the feed wheel (4) to an empty gap (8) in the counting wheel (5), and a stripper (10) being located above and adjacent the feed and counting wheels.

2. An apparatus as defined in claim 1, characterized in that a device (9) for picking up the objects from the counting wheel (5) is located at the periphery of the counting wheel.

3. An apparatus as defined in claim 1, characterized in that the drive means (6) of the feed wheel and counting wheel (4,5) comprises two step wheels (14,15), which are provided with radial grooves (16) coacting with a crank roll (13) on a crank arm (12), the rotation centre of which is located centrally between the step wheels and which rotates the step wheels (14,15) in steps and alternatingly, and that the step wheels are provided with recesses (17) between the radial grooves (16), which recesses are adjusted to the radius of a pin (18) disposed in the rotation centre of the crank arm (12) and formed as a cylinder with an arched recess in the side surface facing the roll (13).

4. An apparatus as defined in claim 3, characterized in that the overload couplings (19,20) connect the step wheels (14,15) with the axles (21,22) on which they are located, said axles (21,22) being provided with a toothed ring (23) retained between two spring-loaded levers (29), which are disposed on the step wheels (14,15) and provided with pins (30) fitting in between the teeth on the toothed rings (23), and that the number of teeth on the toothed rings (23) is a multiple of the number of radial grooves (16) in the step wheels (14,15).

5. An apparatus as defined in claim 1, wherein couplings (19, 20) are located between the feed wheels and, respectively, counting wheel (4, 5) and a motor for driving said wheels, which couplings release at overload and thereby are rotated a distance corresponding to the distance between the gaps (7, 8) on the feed wheel and counting wheel (4, 5) respectively.

* * * * *